Patented Oct. 14, 1952

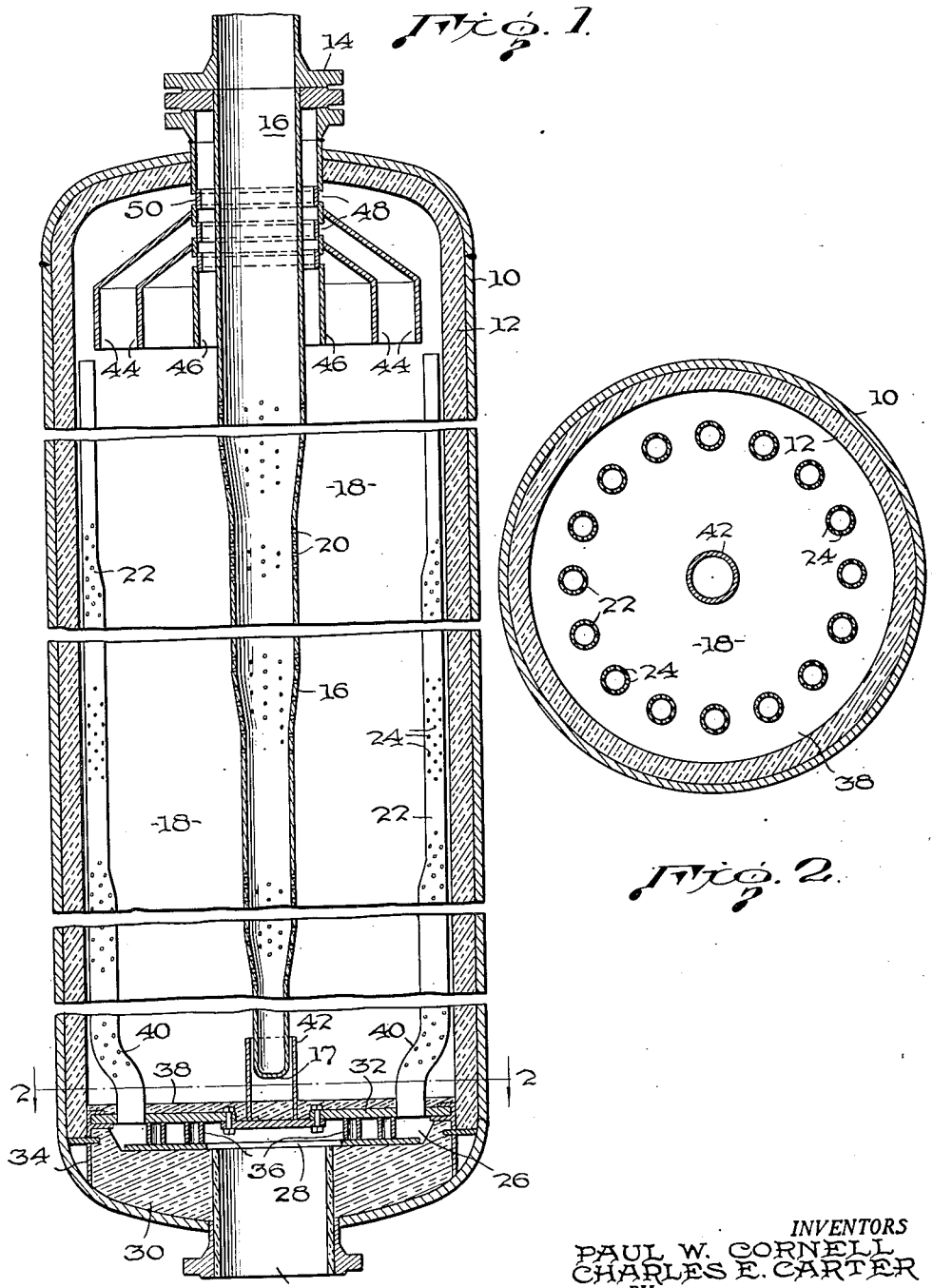

2,614,033

UNITED STATES PATENT OFFICE 2,614,033

HYDRODESULFURIZATION REACTOR

Paul W. Cornell, Mount Lebanon, and Charles E. Carter, Canonsburg, Pa., assignors to Gulf Oil Corporation, Pittsburgh, Pa., a corporation of Pennsylvania Application April 26, 1949, Serial No. 89,692

6 Claims. (Cl. 23—288)

This invention deals with chemical reactors, and particularly with catalytic reactors in which the fluid to be treated, in vapor or liquid phase, is caused to pass through a body of particulate catalytic material under controlled conditions to effect a desired alteration in the nature of the fluid.

It has been observed that in catalytic operations, particularly those involving the hydrogenation of very heavy catalytic charge stocks, a portion of the material fed to the catalyst bed is not vaporized, and certain phenomena occur which are injurious to the catalyst. They are associated with the deposition of a layer of heavy material on the top of the catalyst bed and this heavy material in remaining thereon for a considerable length of time, destroys or alters the efficiency of the catalyst for purposes of the reaction. It has been further observed that this phenomenon occurs in the common type of reactor which introduces the charge to a disengaging or plenum chamber for distribution of the incoming material across the catalyst bed. It has also been observed that this deleterious effect on the catalyst does not extend into the catalyst bed beyond a relatively short distance, indicating that once the heavy portion of the material has attained a high velocity within the bed it is converted to desirable products and does not further effect injury to the catalyst. Moreover, it has been found that catalyst beds requiring regeneration to oxidize the contaminants deposited on the catalyst are generally associated with a very much higher pressure drop for the regeneration operation than for the processing operation, when both of these are carried out within the length of time allowed by the type of operating cycle normally employed.

Another serious problem encountered in conventional catalyst reactors when operated in alternating reaction and regeneration phases is the severe mechanical load imposed on the arrangements employed for supporting the catalyst bed. These arrangements generally comprise some kind of a grate, grid, or other structure which must be so built as to permit the gases to pass through it and at the same time to withstand the strains imposed not only by the weight of the catalyst bed but also by the pressure drop developed by the gases passing through the bed. Further, the supporting structure is exposed to the high temperatures developed by the oxidation of the contaminant on the catalyst immediately adjacent thereto and this also imposes a severe strain on the supporting structure.

It is a principal object of this invention to provide a catalyst reaction chamber or tower in which the rate at which incoming fluid material to be treated is passed through the catalytic material is equalized, so that all portions of such catalytic material are substantially equally effective in the treatment process, to provide optimum utilization of the catalytic material.

It is a further important object of the invention to provide such a device in which the pressure drop encountered across the body of catalytic material during the regeneration phase will be as low as possible consistent with economical size of the apparatus.

Still another object of the invention is to provide a catalytic reaction apparatus whose design simplifies the construction of the supporting arrangements for the bed of catalytic material, and which reduces the degree to which such supporting arrangements are subjected to the high temperatures involved in the oxidation of the contaminant during the regeneration phase, with consequent reduction in deterioration of the supporting structure.

A further object of the invention is to provide a catalytic reactor so arranged that the velocity of the fluid material being passed through the catalyst bed is at a maximum near the point at which it enters the bed and is at a minimum at the point where it leaves, to provide a more efficient utilization of the catalytic material and a reduced pressure gradient for the regenerating fluid, thereby reducing the cost of the regeneration operation since the off-gases may be recycled without much compression.

An additional object of the invention is to provide a catalytic reactor of the above type in the general configuration of a vertical tower containing an axially located perforate entrance conduit for the vapors or liquid to be treated, a generally cylindrical mass or body of catalytic material surrounding said entrance conduit, and a plurality of circumferentially spaced perforate outlet conduits around the catalytic body, the effective cross-sections of the perforate inlet and outlet conduits being tapered in opposite directions lengthwise of the tower so as to control the velocity of fluid passing through the catalyst material for the most effective utilization thereof.

A further object of the invention is to provide a reaction chamber of the type described above in which the arrangements for filling and emptying the chamber with granular catalyst or the like are simplified.

Still another object of the invention is to provide an improved apparatus for the catalytic treatment of fluid materials, involving features of control of the application of the material to be treated, and especially of its rate of flow through different portions of the catalyst, to provide a more effective and economical utilization of the catalyst and to reduce the time required for regeneration of such catalytic material.

A further important object of the invention is to provide an improved method for the catalytic treatment of fluids, which will increase the efficiency of utilization of the catalyst and the efficiency of required regeneration operations, and will provide additional operating advantages which will be pointed out more particularly hereinafter.

The above and other objects and advantages of the invention will become more apparent from the following detailed specification of an exemplary embodiment of the invention, taken in connection with the appended drawings, which form a part hereof, and in which Fig. 1 is a vertical sectional view of a catalytic reactor in accordance with the invention and especially adapted to the hydrodesulfurization of hydrocarbons in the vapor form, and Fig. 2 is a horizontal sectional view taken on line 2—2 of Fig. 1.

Referring now particularly to Fig. 1 of the drawing, the preferred embodiment of the invention is there illustrated as a reactor comprising a shell 10, which is usually formed of steel and constitutes the principal housing and structural support for the apparatus. This shell is provided with any desired or known form of refractory insulating liner 12 covering its inner surface. Fluid material, usually a heated vapor, to be treated in the reactor is admitted via a nozzle 14 into a conduit 16 which extends downwardly in a centered axial location to a point adjacent the bottom of the tower.

For reasons which will be pointed out below, the diameter of inlet conduit 16 is reduced along its length until at its closed lower end 17 it has reached a minimum size. The space between the outer periphery of conduit 16 and the refractory lining 12 therefore defines an annular chamber 18 adapted to contain a mass or bed of catalytic material, generally introduced in particulate form, and adapted to the treatment of vapors conveyed by conduit 16 and allowed to issue into the bed of catalyst material through orifices 20 in the wall of said conduit.

In order to collect the treated vapors after they have passed horizontally and radially from the orifices in conduit 16 and and across the bed of catalyst, there are provided a plurality of collection pipes or conduits 22 which are spaced about the tower as close as possible to the inner lining 12. The upper ends of these condits 22 are closed, and each condit is provided with a plurality of fluid-admitting orifices 24 spaced along its length.

It will be observed that the diameter of each outlet conduit 22 increases from its closed upper end towards its open lower end, the reason for which will be pointed out in detail hereinafter. At the lower end of the tower, all of the conduits 22 are in communication with a plenum chamber or manifold 26 defined between a lower plate 28 resting upon a body of insulating material 30 which is in turn supported by the bottom of shell 10, and an upper plate or tube sheet 32 suitably supported upon the bottom of the shell as by a flanged metallic liner 34. In view of the considerable weight of the mass of catalyst material in the tower, upper plate 32 is additionally supported by a plurality of spaced-apart tubular members 36 which rest upon the lower plate 28 and are, therefore, in turn supported by the insulating material 30 and the shell 10. The upper surface of upper plate 32 may be protected from direct contact with the heated catalyst material as by a layer of insulating material 38, and the lower ends of outlet conduits 22 are preferably offset inwardly as at 40 to pass through plate 32 and be sealed thereto by known arrangements which prevent the escape of particles of catalytic material into the chamber 26.

To provide structural rigidity for the central or inlet conduit 16, and to maintain it in its centered position, its lower end 17 may be received within a short cylindrical guide section 42 extending upwardly from a support plate suitably secured as by bolts to the upper plate 32 of chamber 26; this support plate may thus be removed when required for the renewal of catalyst in the tower.

It has been found that contact beds of catalytic material employed in the hydroesulfurization process may be expected to shrink in volume between 10 and 15 per cent during their operating life. It is apparent that if excessive shrinkage occurs in an apparatus of the type described above, the upper level of the catalytic body might be lowered sufficiently to enable incoming fluids to by-pass the contact bed. To prevent this, the present invention provides a multiplicity of annular baffles 44 adjacent the upper end of the tower, and fastened to a central support baffle 46. This central support baffle is provided with a number of openings 48 extending wholly or partially around its circumference, these openings providing for the introduction of the catalyst material into the annular spaces between shrouds and the shell or lining 12. Closure rings 50 are provided for insertion within the central baffle 46 to close off the openings 48 after the introduction of catalytic material, thereby to prevent short-circuiting of the contact bed by fluids which would otherwise pass through said openings. The closures 50 may be fastened in place by any suitable securing means.

By providing the openings in the central support baffle, the catalyst can be introduced into the baffled sections. When shrinkage occurs, the catalyst falls from the baffled zones to replace the volume lost. Sufficient catalyst will still remain within the baffled zones to provide enough resistance to flow to keep vapors from skirting the top of the catalyst bed and thus escape untreated. In this manner, the equipment provided solves the shrinkage and by-pass problem which would otherwise render the radial flow reactor ineffective.

The operation of filling the tower with catalyst material may conveniently be carried out by initially inserting in the axial position a screen or perforated shape approximating the shape of the conduit 16, so that after filling the tower with catalyst the inlet conduit may be inserted in place without disturbing the bed; alternatively, the inlet conduit may be made in sections which are fastened together in succession from the bottom upwardly during the filling operation. These arrangements form no part of the present invention and the selection of the preferred method will depend to some extent upon the relative size of the catalyst particles employed.

From the above description it will be appreciated that fluids entering the contact bed from the inlet conduit 16 pass out radially through orifices such as 20 (only a few of which have been indicated in the drawing for purposes of illustration) and thence horizontally and radially toward the outlet conduits 22 which are also provided with orifices along their entire length. The fluids issuing from any small element of conduit 16 therefore have their highest velocity at the point of entry into the catalyst material, this velocity decreasing as the fluids pass across the catalyst and reaching a minimum at the point at which the treated fluids pass into the orifices of the outlet conduits 22. The reduction in velocity of the fluid at the outlet point is especially advantageous since the minimum velocity permits a more efficient utilization of a catalyst before exhaustion, at which point the bed is considered to require regeneration. Treated fluids entering conduits 22 ultimately pass into manifold 26 and thence out of the reactor via exit conduit 52. The path of travel and the low linear velocity in the catalyst bed during regeneration permit a reactor of this design to accomplish the regeneration with a far lower pressure drop for the regenerating fluid than is found with a conventional reactor employing longitudinal flow through a bed of any appreciable depth. This decrease in pressure drop through the bed during regeneration will also effect a substantial reduction in the costs associated with the regeneration operation, since the off-gases may be recycled without much compression.

The design of the orifices in the inlet and outlet conduits will be such as to provide the proper distribution through the bed and the proper fluid velocity upon entering and leaving it. In a conventional reactor the catalyst bed support must withstand not only the weight of the catalyst bed above it but also the great pressure drop imparted by the fluid medium flowing through it. By passing the fluids parallel to the support tray 32 as is done in this reactor this tray is required to support essentially only the weight of the catalyst. The additional stresses imposed by the pressure drop are taken up by the protected shell 10 and, percentagewise, amount to only a small portion of the total stresses that the shell withstands.

The successive variations in diameter of conduits 16 and 22 are illustrated in the drawing as obtained by the use of tapered sections at spaced points along their lengths, but it will be understood that such successive reductions can conveniently be obtained by the use of standard reducing fittings connecting separate conduit sections of proper diameter. In the case of the outlet conduits 22 these reducing fittings will preferably be of the offset type in order to maintain the conduits 22 as close as possible to the inner surface of shell liner 12. The ideal relationship between changes in the diameters of the conduits 16 and 22 is such that the percentage increase in the sum of the cross-sectional areas of the collector conduits 22 across any zone will correspond proportionately to the percentage decrease in the cross-sectional area of the inlet conduit 16, across that zone. The hydraulic properties of a properly designed conduit 16 including its openings 20 into the bed will be such that the amount of feed introduced into any section of the bed will be the same as the amount of feed introduced into any other section of the bed of the same size. It is therefore necessary to provide a conduit of such shape that the linear velocity of the material remaining in the conduit after a partial withdrawal will be the same as the linear velocity of the material before that withdrawal was made. By maintaining a constant velocity for all material remaining in the conduit after successive withdrawals, the kinetic energy of the stream within the conduit remains essentially constant as will the kinetic energy loss resulting from the change of direction as withdrawals are made into the bed. This promotes a uniform rate of withdrawal along the axis of the bed.

The actual magnitude of the uniform velocity within the conduit 16 is determined by economic considerations; that is, by the losses in pressure which are determined to be economically feasible. Theoretically, therefore, the shape of the conduit is independent of the inlet velocity, and that portion of the conduit lying within the confines of the "operating" catalyst should be of such shape that the cross-sectional area at any point will be proportional to the fraction of the remaining confined length of the conduit at that point. Thus, if L represents the length of the conduit 16 within the operating bed of catalyst and D the diameter of the conduit opening at the entrance, then the cross-sectional diameter $d$ at any distance $l$ from the entrance can be found from the formula $$d^2 = \frac{L-l}{L} D^2$$

where consistent units are used throughout. Thus the diameter of the conduit 16 halfway down the bed will be about 70.7 per cent of the diameter at the top of the bed. Practically, however, for reasons of convenience we prefer the use of standard pipe reducing sections which will enable the ideal curved shape to be approximated sufficiently closely for practical purposes.

The above description deals with the specific construction of a preferred embodiment of the invention which has been found to satisfy all of the stated objects, but it will be understood that many changes and modifications in this design may be made by those skilled in the art without departing from the spirit of the invention as defined in the appended claims.

What we claim is:

1. A reactor comprising a cylindrical shell, a cirumferentially perforated inlet conduit the diameter of which decreases downwardly from its entrance at the top of said shell, said inlet conduit extending axially within said shell and terminating in a closed end spaced from the adjacent shell end, a plurality of perforate collecting conduits the diameter of each of which decreases upwardly from its exit end in the lower portion of said shell, said collecting conduits extending lengthwise of said shell and closely adjacent its inner wall, a support structure for treatment material extending to the inner wall of the reactor beneath the end of said inlet conduit and formed with spaced openings communicating respectively with said collecting conduits, said support structure defining a collecting chamber, and an outlet conduit in communication with said chamber.

2. A reaction tower comprising a vertically arranged cylindrical shell adapted to contain a body of treatment material, a perforated cylindrical inlet conduit extending downwardly and centrally within said shell, said inlet conduit being of progressively reduced diameter in downward direction, a support structure extending horizontally across said shell below the lower end of said inlet conduit, said support structure being adapted to support said body of treatment material thereabove and defining with the bottom portion of said shell a lower, plenum chamber, a plurality of perforate collecting conduits of progressively increased diameter in downward direction communicating with the plenum chamber through said support structure and extending upwardly parallel to said inlet conduit, said collecting conduits being located closely adjacent the inner surface of said shell, and an outlet conduit communicating with said chamber.

3. A reactor comprising a cylindrical shell having its axis vertical, a perforated inlet conduit extending from the upper end of said shell downwardly in a centered position through said shell and terminating in a closed end spaced from the bottom of said shell, the cross-sectional area of said inlet conduit decreasing in downward direction in such manner that the linear velocity of fluid flowing therethrough after its partial withdrawal through upstream perforations in said conduit will be substantially the same as the linear velocity of the fluid before such withdrawal, the said conduit defining between itself and the inner wall of said shell an annular chamber adapted to receive a body of catalyst material, perforate collecting conduits for fluid passing from said inlet conduit radially through said chamber, said collecting conduits being disposed about the inner periphery of said shell and having cross-sectional areas which increase in downward direction in such manner that the percentage increase in the sum of their cross-sectional areas across any horizontal zone corresponds substantially proportionally to the percentage decrease in the cross-sectional area of said inlet conduit, a partition located below the lower end of said inlet conduit, said partition defining a collecting manifold in the lower portion of said shell, said collecting conduits opening into said collecting manifold through openings in said partition, and a discharge conduit leading through the lower portion of said shell from the collecting manifold.

4. The invention in accordance with claim 3, and means carried by said partition for receiving and supporting the closed lower end of said conduit.

5. A reactor comprising a cylindrical shell having its axis vertical, a perforated inlet conduit extending from the upper end of said shell downwardly in a centered position into said shell and terminating in a closed end spaced from the bottom of said shell, the cross-sectional area of said conduit being progressively decreased toward its closed lower end, and defining between itself and the inner wall of said shell an annular chamber adapted to receive a body of catalyst material, perforate collecting conduits for fluid passing from said inlet conduit radially through said chamber, said collecting conduits extending through a transverse partition located below the closed end of said inlet conduit and upwardly into the annular chamber surrounding said inlet conduit at locations about the inner periphery of said shell, an annular baffle within said shell surrounding the upper end of said inlet conduit, said baffle having openings therein for the introduction of catalyst material into said chamber and having a depending skirt portion adapted to extend into the bed of contained catalyst material, adjustable closure means for said openings, and a discharge conduit leading from the space beneath said transverse partition.

6. A reactor comprising a shell divided internally by a partition into an upper chamber for contact material and a lower, fluid collecting chamber, a fluid inlet conduit extending into said upper chamber, said conduit being perforated throughout that portion which extends into the bed of contact material and varying in diameter from its entrance in substantial accordance with the formula $$d^2 = \frac{L-l}{L} D^2$$

where $d$ = the cross sectional diameter of the conduit at a selected point of measurement
$L$ = overall length of the conduit
$l$ = distance from the entrance of the conduit to the point of measurement
$D$ = diameter of the conduit at its entrance, laterally spaced collection conduits varying inversely in diameter with respect to the varying diameter of said inlet conduit, said collection conduits extending through said transverse partition and opening into the fluid collecting chamber, the portion of said conduits above said transverse partition being perforated and so shaped that the percentage increase in the sum of their several cross-sectional areas across any horizontal zone corresponds substantially proportionally to the percentage decrease in the cross-sectional area of the inlet conduit, and a discharge conduit leading from said fluid collecting chamber.

PAUL W. CORNELL.
CHARLES E. CARTER.

REFERENCES CITED

The following references are of record in the file of this patent:

UNITED STATES PATENTS

| Number | Name | Date |
|---|---|---|
| 2,042,469 | Joseph | June 2, 1936 |
| 2,078,947 | Houdry et al. | May 4, 1937 |
| 2,108,069 | Lassait | Feb. 15, 1938 |
| 2,143,009 | Houdry | Jan. 10, 1939 |
| 2,150,930 | Lassait | Mar. 21, 1939 |
| 2,257,178 | Martin et al. | Sept. 30, 1941 |
| 2,261,293 | Samans | Nov. 4, 1941 |
| 2,276,340 | Pricket et al. | Mar. 17, 1942 |
| 2,315,208 | Kinnard | Mar. 30, 1943 |
| 2,329,847 | McCausland | Sept. 21, 1943 |
| 2,534,209 | Reed | Dec. 12, 1950 |

FOREIGN PATENTS

| Number | Country | Date |
|---|---|---|
| 291,253 | Great Britain | May 31, 1928 |
| 639,081 | Germany | Nov. 12, 1936 |